United States Patent
Petri et al.

(10) Patent No.: US 7,511,181 B2
(45) Date of Patent: Mar. 31, 2009

(54) PRODUCTION OF DIESEL FUEL FROM BIORENEWABLE FEEDSTOCKS

(75) Inventors: John A. Petri, Palatine, IL (US); Terry L. Marker, Palos Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 12/036,553

(22) Filed: Feb. 25, 2008

(65) Prior Publication Data

US 2008/0154073 A1    Jun. 26, 2008

Related U.S. Application Data

(63) Continuation-in-part of application No. 11/415,707, filed on May 2, 2006, now abandoned.

(51) Int. Cl.
*C07C 1/20* (2006.01)
(52) U.S. Cl. ........................ 585/240; 585/241
(58) Field of Classification Search .......... 585/240–242
See application file for complete search history.

(56) References Cited

U.S. PATENT DOCUMENTS

| 4,300,009 | A | 11/1981 | Haag et al. ............ 585/408 |
| 4,992,605 | A | 2/1991 | Craig et al. ............ 585/240 |
| 7,232,935 | B2 * | 6/2007 | Jakkula et al. .......... 585/240 |
| 2003/0177691 | A1 | 9/2003 | Stewart et al. ............ 44/389 |
| 2004/0230085 | A1 | 11/2004 | Jakkula et al. .......... 585/240 |

FOREIGN PATENT DOCUMENTS

EP    1 396 531 A2    9/2003

* cited by examiner

*Primary Examiner*—In Suk Bullock
(74) *Attorney, Agent, or Firm*—Frank S Molinaro

(57) ABSTRACT

A process has been developed for producing a hydrocarbon component useful as diesel fuel from biorenewable feedstocks such as plant oils and greases. The process involves hydrogenating and deoxygenating, i.e. decarboxylating and/or hydrodeoxygenating the feedstock to provide a hydrocarbon fraction useful as a diesel fuel. An optional pretreatment step to remove contaminants such as alkali metals from the feedstock can also be carried out. If desired, the hydrocarbon fraction can be isomerized to improve cold flow properties.

10 Claims, No Drawings

PRODUCTION OF DIESEL FUEL FROM BIORENEWABLE FEEDSTOCKS

CROSS-REFERENCE TO RELATED APPLICATION

This application is a Continuation-In-Part of copending application Ser. No. 11/415,707 filed May 2, 2006, the contents of which are hereby incorporated by reference in its entirety.

FIELD OF THE INVENTION

This invention relates to a process for producing hydrocarbons useful as diesel fuel from biorenewable feedstocks such as plant oils and greases. The process first involves a pretreatment step to remove contaminants such as alkali metals contained in the feedstock followed by hydrogenation, decarboxylation and/or hydrodeoxygenation and optionally hydroisomerization in one or more steps.

BACKGROUND OF THE INVENTION

As the demand for diesel fuel increases worldwide there is increasing interest in sources other than crude oil for producing diesel fuel. One such source is what has been termed biorenewable sources. These sources include plant oils such as corn, rapeseed, canola and soybean oils and greases such as inedible tallow, yellow and brown greases. The common feature of these sources is that they are composed of triglycerides and Free Fatty Acids (FFA). Both of these compounds contain n-paraffin chains having 10 to 20 carbon atoms. The n-paraffin chains in the tri-glycerides or FFAs can also be mono, di or poly-unsaturated.

There are reports in the art disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Applicants have developed a process which comprises a pretreatment step, and one or more steps to hydrogenate, decarboxylate (and/or hydrodeoxygenate) and optionally hydroisomerize the feedstock. The pretreatment step removes contaminants that can poison the downstream catalysts.

SUMMARY OF THE INVENTION

A process for producing a hydrocarbon fraction from a biorenewable feedstock comprising passing the feedstock to a reaction zone; contacting the feedstock with a catalyst at reaction conditions comprising a temperature of about 200° C. to about 345° C., a hydrogen partial pressure of about 1034 kPa (150 psi) to less than 2000 kPa (290 psi) and a liquid hourly space velocity of about 0.5 $hr^{-1}$ to about 2 $hr^{-1}$ thereby deoxygenating the first effluent stream and providing a reaction product comprising a hydrocarbon fraction comprising n-paraffins.

Prior to reacting the feedstock in the reaction zone, the feedstock may be treated to at least partially remove contaminants by contacting the feedstock with either an acidic ion exchange resin or an acid solution in a pretreatment zone.

This and other objects and embodiments will become clearer after the following detailed description of the invention.

DETAILED DESCRIPTION OF THE INVENTION

As stated the present invention relates to a process for producing a hydrocarbon stream useful as diesel fuel from biorenewable feedstocks. The biorenewable feedstocks that can be used in the present invention include any of those which comprise primarily tri-glycerides and free fatty acids (FFA). Examples of these feedstocks include but are not limited to canola oil, corn oil, soy oils, inedible tallow, yellow and brown greases, etc. As further stated the tri-glycerides and FFAs contain aliphatic hydrocarbon chains in their structure having 10 to 20 carbons. Another example of a biorenewable feedstock that can be used in the present invention is tall oil. Tall oil is a by-product of the wood processing industry. Tall oil contains esters and rosin acids in addition to FFAs. Rosin acids are cyclic carboxylic acids. However, these biorenewable feedstocks also contain contaminants such as alkali metals, e.g. sodium and potassium, phosphorous as well as solids, water and detergents.

Although the feedstock can be processed, i.e. hydrodeoxygenated, to hydrocarbons, without any prior treatments, it is preferred to pretreat the feedstock in order to remove as much of these contaminants as possible. One pretreatment step involves contacting the biorenewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. The conditions at which the reactor is operated are well known in the art and include a liquid hourly space velocity (LHSV) of about 0.5 to about 2 $hr^{-1}$, a temperature of about 21° C. to about 100° C. and a pressure of about 172 kpa (25 psi) to about 3447 kPa (500 psi).

Another means for removing contaminants is a mild acid wash. This is carried out by contacting the feedstock with an acid such as sulfuric, nitric or hydrochloric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner.

Yet another means of removing metal contaminants from the feedstock is through the use of guard beds which are well known in the art. These can include alumina guard beds either with or without demetallation catalysts such as nickel or cobalt.

The purified feedstock from the pretreatment zone, herein referred to as a first effluent stream, is now flowed to a reaction zone comprising one or more catalyst beds in one or more reactor. If more than one catalyst bed is used, the first catalyst bed will contain a hydrogenation catalyst with which either the first effluent stream or the raw feedstock is contacted in the presence of hydrogen at hydrogenation conditions to hydrogenate the olefinic or unsaturated portions of the n-paraffinic chains. Hydrogenation catalysts are any of those well known in the art such as nickel or nickel/molybdenum dispersed on a high surface area support. Other hydrogenation catalysts include a noble metal catalytic element dispersed on a high surface area support. Non-limiting examples of noble metals include Pt and/or Pd dispersed on gamma-alumina. Hydrogenation conditions include a temperature of about 200° C. to about 300° C. and a hydrogen partial pressure of about 345 kPa (50 psi) to about 2758 kPa (400 psi), and a LHSV of about 1 to about 5 hr$^{-1}$. Other operating conditions for a hydrogenation bed or zone are well known in the art.

The hydrogenation catalysts enumerated above are also capable of catalyzing decarboxylation and/or hydrodeoxygenation of the first effluent stream or feedstock to remove oxygen. Decarboxylation and hydrodeoxygenation are herein collectively referred to as deoxygenation reactions. Deoxygenation conditions include a relatively low hydrogen partial pressure of about 1034 kPa (150 psi) to less than 2000 kPa (290 psi), a temperature of about 288° C. to about 345° C. and a liquid hourly space velocity of about 1 to about 4 hr$^{-1}$. In a multi bed system, deoxygenation will take place in the second bed or after the last hydrogenation bed.

Since hydrogenation is an exothermic reaction, as the first effluent or feedstock flows through the catalyst bed, decarboxylation and hydrodeoxygenation will begin to occur. Thus, it is envisioned and is within the scope of this invention that hydrogenation and deoxygenation occur simultaneously in one bed. If only one bed is used, then hydrogenation occurs primarily at the front of the bed, while deoxygenation occurs mainly in the middle and bottom of the bed. Finally, if desired hydrogenation can be carried out in one reactor, while deoxygenation can be carried out in a separate reactor. It is preferred to carry out hydrogenation and deoxygenation in one reactor.

As will be shown in more details in the examples, it is surprising that the biorenewable feedstocks can be converted to hydrocarbons at such low pressures. It has been surprisingly found that carrying out the process at lower pressures decreases the amount of hydrogen used because decarboxylation is favored over hydrodeoxygenation. It is also surprising that the catalyst remains stable over an extended time period. It is usually the case that catalysts deactivate rapidly at lower pressures. Running the process at lower pressures also has an economic advantage because compressors to pressurize the hydrogen are not needed. Further, the vessel and other equipment cost is reduced because operation is at lower pressures.

It is also an embodiment of the present invention that the biorenewable feedstocks can be mixed with a petroleum fraction either prior to flowing it to the reaction zone or in the reaction zone itself. If the biorenewable feedstock is first treated to remove contaminants, it is mixed with the petroleum fraction after this pretreatment. The petroleum fraction can be any of those hydrocarbon streams which are routinely processed using fluidized catalytic cracking (FCC) technology and which are well known in the art. The amount of petroleum fraction which can be added can vary widely but is usually between 5 and 80% by volume.

The reaction product from the reaction zone will comprise a liquid portion and a gaseous portion. The liquid portion comprises a hydrocarbon fraction which is essentially all n-paraffins and have a cetane number of about 100. Although this hydrocarbon fraction is useful as a diesel fuel, because it comprises essentially all n-paraffins, it will have poor cold flow properties. If it is desired to improve the cold flow properties of the liquid hydrocarbon fraction, then the entire reaction product can be contacted with an isomerization catalyst under isomerization conditions to at least partially isomerize the n-paraffins to isoparaffins. Catalysts and conditions for isomerization are well known in the art. See for example US 2004/0230085 A1 which is incorporated by reference. Isomerization can be carried out in a separate bed of the same reaction zone, i.e. same reactor, described above or it can be carried out in a separate reactor.

Whether isomerization is carried out or not, the final effluent stream, i.e. the stream obtained after all reactions have been carried out, is now processed through one or more separation steps to obtain a purified hydrocarbon stream useful as a diesel fuel. As stated above, the final effluent stream comprises a liquid and a gaseous component. The liquid and gaseous components are separated using a high-pressure separator well known in the art. The gaseous component comprises mostly hydrogen and the carbon dioxide from the decarboxylation reaction which can be removed by means well known in the art such as absorption with an amine, reaction with a hot carbonate solution, pressure swing absorption, etc. If desired, essentially pure carbon dioxide can be recovered by regenerating the spent absorption media.

Finally, a portion of the purified hydrocarbon stream and/or the carbon dioxide free gaseous stream can be recycled to the inlet of the reaction zone where hydrogenation primarily occurs and/or to any subsequent beds/reactors to control the temperature rise across the individual beds.

The following examples are presented in illustration of this invention and are not intended as undue limitations on the generally broad scope of the invention as set out in the appended claims.

EXAMPLE 1

Several experiments were conducted to test hydrogenation/decarboxylation catalysts both in a batch mode and a continuous mode. The feeds used where either a soybean oil feed (Aldrich) or a crude tall oil feed (Weyerhauser) and the catalysts were obtained from UOP LLC. Table 1 presents the results from these experiments.

TABLE 1

Treatment of Bio-Oils under Various Conditions

| | Feed | | | | |
|---|---|---|---|---|---|
| | Soybean Oil | Soybean Oil | Crude Tall Oil | Soybean Oil | Soybean Oil |
| Catalyst | NiMo | CoMo | NiMo | NiMo | NiMo |
| Test unit | Autoclave | Autoclave | Autoclave | Continuous | Continuous |
| WHSV (hr$^{-1}$) | 1.9 | 1.7 | 2.3 | 0.8 | 0.3 |
| Temperature (° C.) | 300-350 | 300-350 | 300-350 | 325 | 310 |
| H$_2$ Pressure (psia) | 500 | 500 | 500 | 500 | 500 |
| Products | | | | | |
| % water | 1.7 | 1.2 | 2.9 | 5.2 | 10.4 |
| % CO2 + CO | 12.7 | 13.4 | 15.2 | 2.7 | 2.0 |
| % light HC[1] | 7.0 | 5.2 | 5.8 | 2.8 | 3.1 |
| % diesel+ | 79 | 80 | 76 | 98 | 90 |

TABLE 1-continued

Treatment of Bio-Oils under Various Conditions

| | Feed | | | | |
|---|---|---|---|---|---|
| | Soybean Oil | Soybean Oil | Crude Tall Oil | Soybean Oil | Soybean Oil |
| % heavy[2] | 0 | 3.2 | 7.6 | 0.6 | 0.4 |
| % deoxygenation | 90+ | 91+ | 96 | 85 | 99 |

[1]light hydrocarbons are primarily propane with some small amounts of methane and butanes.
[2]heavy components have a carbon number > 20

EXAMPLE 2

A crude vegetable oil fraction (obtained from Cargill) was processed by placing 50 gm of Amberlyst™-15 into a 100 cc column. To this there were added 25 gm of the Cargill crude vegetable oil. This was followed by an additional 50 gm of crude. The treated solution and feed solution were analyzed for net content and the results are shown in Table 2.

TABLE 2

Metal Content of Untreated and Treated Vegetable Oil

| Metal | Untreated (ppm) | Treated (ppm) |
|---|---|---|
| Ca | 73 | 27.1 |
| Fe | 1.6 | 0.6 |
| Mg | 64.9 | 20.1 |
| Na | 3.1 | 2.1 |
| P | 653 | 161 |
| K | 407 | 99.1 |

EXAMPLE 3

Several experiments were carried out according to Example 1 to determine the effect of pressure on activity and catalyst life. The results are presented in Table 3.

TABLE 3

Bio-Fuel Conversion at Low and High Pressure

| | Feed | | | |
|---|---|---|---|---|
| | Canola | Canola | Canola | Canola |
| Catalyst | NiMo | NiMo | NiMo | Ni Mo |
| LHSV (hr$^{-1}$) | 1 | 1 | 1 | 1 |
| Temperature (° C.) | 315 | 315 | 315 | 315 |
| H$_2$ Pressure (psia) | 500 | 500 | 250 | 250 |
| Hours on Stream | 100 | 2000 | 0 | 1000 |
| Products | | | | |
| % water (by difference) | 7.9 | 8.8 | 7.1 | 7.1 |
| % CO2 + CO | 6.0 | 5.0 | 5.4 | 5.4 |
| % light HC | 5.5 | 5.5 | 5.4 | 5.4 |
| % diesel+ | 83.5 | 83.8 | 83.8 | 82.9 |
| % H2 added | 3.0 | 3.1 | 3.0 | 3.0 |
| % triglyceride conversion | 100 | 100 | 98.7 | 97.8 |
| % deoxygenation | 98 | 98 | 96 | 95 |
| nC17/nc18 | 0.9 | 0.8 | 0.8 | 0.95 |
| CO/CO2 | 10 | 3.5 | 1.5 | 1.5 |

Operation at lower pressures is expected to cost less because the hydrogen makeup gas compressor could be eliminated since hydrogen is typically available from other sections of a refinery plant at about 2413 kPa (350 psia). Lower cost reactor vessels are also possible since they can be fabricated with thinner walls because of the lower pressure requirements.

From the results it is observed that low pressure operation gives almost the same level of conversion as high pressure operation. Obtaining the same conversion at lower pressure can be obtained by slightly decreasing the space velocity to obtain 100% conversion. More decarbonylation is occurring in the low pressure case as indicated by the ratio of nC17/nC18. Normal-C17 is formed by decarbonylation+decarboxylation whereas nC18 is formed by hydrodeoxygenation. Interestingly as the catalyst ages the level of decarbonylation+decarboxylation increases at low pressure whereas at higher pressure it decreases as the catalyst ages. The hydrogen consumption remained the same in these experiments regardless of pressure.

The most important result of these experiments is that the catalyst does not severely deactivate at lower pressures so that by running the process at lower space velocity one should be able to easily compensate for the deactivation rate at the lower pressures. Conventional wisdom suggests that the catalyst would deactivate rapidly at low pressure. However, these experiments surprisingly show that the catalyst still has good activity after 1000 hours on stream at lower pressures.

The invention claimed is:

1. A process for producing a hydrocarbon fraction from a biorenewable feedstock comprising pre-treating the feedstock in a pretreatment zone at pretreatment conditions to remove at least a portion of contaminants in the feedstock and produce a first effluent stream; reacting the first effluent stream in a reaction zone by contacting the first effluent stream with a catalyst at reaction conditions comprising a temperature of about 200° C. to about 300° C., a hydrogen partial pressure of about 1034 kPa (150 psi) to less than 2000 kPa (290 psi) and a liquid hourly space velocity of about 0.5 hr$^{-1}$ to about 2 hr$^{-1}$ thereby hydrogenating and deoxygenating the first effluent stream to provide a reaction product comprising a hydrocarbon fraction comprising n-paraffins.

2. The process of claim 1 further comprising isomerizing the reaction product by contacting it with an isomerization catalyst at isomerization conditions to isomerize at least a portion of the n-paraffins to iso-paraffins.

3. The process of claim 1 where the pretreatment step comprises contacting the feedstock with an acidic ion exchange resin, contacting the feedstock with an acid solution, or contacting the feedstock with a guard bed.

4. The process of claim 1 where deoxygenation comprises at least one of decarboxylation and hydro-deoxygenation.

5. The process of claim 1 further comprising mixing the first effluent stream with a petroleum fraction.

6. A process for producing a hydrocarbon fraction from a biorenewable feedstock comprising passing the feedstock to a reaction zone; contacting the feedstock with a catalyst at reaction conditions comprising a temperature of about 200° C. to about 300° C., a hydrogen partial pressure of about 1034 kPa (150 psi) to less than 2000 kPa (290 psi) and a liquid hourly space velocity of about 0.5 hr$^{-1}$ to about 2 hr$^{-1}$ thereby deoxygenating the first effluent stream and providing a reaction product comprising a hydrocarbon fraction comprising n-paraffins.

7. The process of claim 5 further comprising isomerizing the reaction product by contacting it with an isomerization catalyst at isomerization conditions to isomerize at least a portion of the n-paraffins to iso-paraffins.

8. The process of claim 5 where deoxygenation comprises at least one of decarboxylation and hydro-deoxygenation.

9. The process of claim 5 where prior to passing the feedstock to the reaction zone, the feedstock is contacted with an acidic ion exchange resin or an acid solution at pretreatment conditions thereby removing at least a portion of contaminants in the feedstock.

10. The process of claim 5 further comprising mixing the feedstock with a petroleum fraction.

* * * * *

UNITED STATES PATENT AND TRADEMARK OFFICE
CERTIFICATE OF CORRECTION

PATENT NO. : 7,511,181 B2  Page 1 of 1
APPLICATION NO. : 12/036553
DATED : March 31, 2009
INVENTOR(S) : John A. Petri et al.

It is certified that error appears in the above-identified patent and that said Letters Patent is hereby corrected as shown below:

On the Title Page, Item (73) should read:
(73) Assignee: UOP LLC, Des Plaines, IL (US) and Eni S.p.A. Rome, ITALY Signed and Sealed this Tenth Day of November, 2009

David J. Kappos
*Director of the United States Patent and Trademark Office*

(12) EX PARTE REEXAMINATION CERTIFICATE (9377th)
United States Patent
Petri et al.

(10) Number: US 7,511,181 C1
(45) Certificate Issued: Oct. 25, 2012

(54) PRODUCTION OF DIESEL FUEL FROM BIORENEWABLE FEEDSTOCKS

(75) Inventors: John A. Petri, Palatine, IL (US); Terry L. Marker, Palos Heights, IL (US)

(73) Assignee: Eni S.p.A., Rome (IT)

Reexamination Request:
No. 90/011,715, May 27, 2011

Reexamination Certificate for:
Patent No.: 7,511,181
Issued: Mar. 31, 2009
Appl. No.: 12/036,553
Filed: Feb. 25, 2008

Certificate of Correction issued Nov. 10, 2009.

Related U.S. Application Data

(63) Continuation-in-part of application No. 11/415,707, filed on May 2, 2006, now abandoned.

(51) Int. Cl.
*C07C 1/20* (2006.01)

(52) U.S. Cl. ............................................ 585/240; 585/241
(58) Field of Classification Search .................... None
See application file for complete search history.

(56) References Cited

To view the complete listing of prior art documents cited during the proceeding for Reexamination Control Number 90/011,715, please refer to the USPTO's public Patent Application Information Retrieval (PAIR) system under the Display References tab.

*Primary Examiner* — Carlos Lopez

(57) ABSTRACT

A process has been developed for producing a hydrocarbon component useful as diesel fuel from biorenewable feedstocks such as plant oils and greases. The process involves hydrogenating and deoxygenating, i.e. decarboxylating and/or hydrodeoxygenating the feedstock to provide a hydrocarbon fraction useful as a diesel fuel. An optional pretreatment step to remove contaminants such as alkali metals from the feedstock can also be carried out. If desired, the hydrocarbon fraction can be isomerized to improve cold flow properties.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 is confirmed.

Claims 6-10 are determined to be patentable as amended.

6. A process for producing a hydrocarbon fraction from a biorenewable feedstock comprising passing the feedstock to a reaction zone; contacting the feedstock with a catalyst at reaction conditions comprising a temperature of about 200° C. to about 300° C., a hydrogen partial pressure of about 1034 kPa (150 psi) to less than 2000 kPa (290 psi) and a liquid hourly space velocity of about $0.5^{-1}$ to about 2 $hr^{-1}$ thereby deoxygenating the [first effluent stream] *feedstock* and providing a reaction product comprising a hydrocarbon fraction comprising n-paraffins.

7. The process of claim [5] *6* further comprising isomerizing the reaction product by contacting it with an isomerization catalyst at isomerization conditions to isomerize at least a portion of the n-paraffins to iso-paraffins.

8. The process of claim [5] *6* where deoxygenation comprises at least one of decarboxylation and hydro-deoxygenation.

9. The process of claim [5] *6* where prior to passing the feedstock to the reaction zone, the feedstock is contacted with an acidic ion exchange resin or an acid solution at pretreatment conditions thereby removing at least a portion of contaminants in the feedstock.

10. The process of claim [5] *6* further comprising mixing the feedstock with a petroleum fraction.

\* \* \* \* \*